(12) United States Patent
Richter et al.

(10) Patent No.: US 8,940,066 B2
(45) Date of Patent: Jan. 27, 2015

(54) BLOWER AIR SUCTION DEVICE

(75) Inventors: Gerald Richter, Aachen (DE); Juergen Hoppen, Cologne (DE); Raymond Ambs, Wegberg (DE)

(73) Assignee: Halla Visteon Climate Control Corporation, Daejeon-si (KR)

( * ) Notice: Subject to any disclaimer, the term of this patent is extended or adjusted under 35 U.S.C. 154(b) by 69 days.

(21) Appl. No.: 13/537,645

(22) Filed: Jun. 29, 2012

(65) Prior Publication Data

US 2013/0000265 A1 Jan. 3, 2013

(30) Foreign Application Priority Data

Jul. 1, 2011 (DE) .......................... 10 2011 051 489

(51) Int. Cl.
*B01D 46/00* (2006.01)
*B60H 1/00* (2006.01)

(52) U.S. Cl.
CPC ........ *B60H 1/00471* (2013.01); *B60H 1/00685* (2013.01); *B60H 2001/00085* (2013.01); *B60H 2001/00714* (2013.01)
USPC ................ 55/385.3; 55/418; 55/419; 55/420; 55/467; 55/471; 123/198 E

(58) Field of Classification Search
CPC . F02M 35/024; F02M 35/04; B01D 2279/60; B01D 46/10; B01D 46/4521
USPC ............. 55/385.1, 385.3, 422, 471, 520, 521, 55/418, 420, 529; 123/198 E; 454/139, 158
See application file for complete search history.

(56) References Cited

U.S. PATENT DOCUMENTS

| | | | |
|---|---|---|---|
| 5,683,478 A | 11/1997 | Anonychuk | |
| 7,485,168 B2 * | 2/2009 | Goupil, Jr. | 55/385.1 |
| 7,670,411 B2 * | 3/2010 | Suzuki | 96/134 |
| 7,879,122 B2 * | 2/2011 | Richter et al. | 55/385.3 |
| 2005/0235833 A1 * | 10/2005 | Sassa et al. | 96/417 |
| 2012/0211293 A1 * | 8/2012 | Leanza et al. | 180/68.3 |
| 2012/0324846 A1 * | 12/2012 | Marx et al. | 55/385.3 |
| 2013/0074459 A1 * | 3/2013 | Kuwada et al. | 55/385.3 |

FOREIGN PATENT DOCUMENTS

| | | |
|---|---|---|
| DE | 10344378 A1 | 5/2004 |
| EP | 0955190 A1 | 10/1999 |
| FR | 2883511 A1 | 9/2006 |
| JP | 2008114715 A | 5/2008 |

* cited by examiner

*Primary Examiner* — Duane Smith
*Assistant Examiner* — Minh-Chau Pham
(74) *Attorney, Agent, or Firm* — Fraser Clemens Martin & Miller LLC; James D. Miller

(57) ABSTRACT

A blower air suction device of a motor vehicle air conditioner includes a blower with a vertical arrangement including a blower motor, a blower rotor, and a blower opening, wherein the blower is ensheathed by a blower scroll, and an air inlet housing with a fresh air opening formed in a front wall and with an ambient air opening. The installation of blower is suspended, that is, with the blower rotor under the blower motor, and the air inlet housing is arranged in the process beneath the blower.

17 Claims, 11 Drawing Sheets

BLOWER AIR SUCTION DEVICE

CROSS-REFERENCE TO RELATED APPLICATION

This application claims the benefit of German Patent Application No. DE 10 2011 051 489.9 filed Jul. 1, 2011, the entire disclosure of which is hereby incorporated herein by reference.

FIELD OF THE INVENTION

The invention relates to a blower air suction device of a motor vehicle air conditioner with vertical blower arrangement.

BACKGROUND OF THE INVENTION

In air conditioners with vertical blower arrangement, the blower rotor is usually arranged above the blower motor. This arrangement at the same time requires an arrangement of the air inlet housing with the fresh air and ambient air flaps above the blower. Moreover, in individual cases, a filter is arranged additionally between the blower and the inlet housing. This results in a considerable installation height. In such an arrangement, the ambient air opening generally points backward and the fresh air opening forward.

The disadvantage of the prior art is not only the installation height, but also the volume required in the vehicle longitudinal direction, particularly if the front wall opening for the fresh air feed is arranged at the height of the blower. In that case, a fresh air duct as well as a flap system for guiding the fresh air flow has to be arranged. As a result, the space requirement is high in the upper front area of the vehicle. In many cases, the required space is not available due to the windshield frame.

Another disadvantage is the backward pointing ambient air opening, which points toward the interior. This arrangement allows a direct sound path from the blower to the passengers, which is disadvantageous for the acoustics. In addition, the conventional arrangements have different directions of inflow of the blower. In the "fresh air" position, the direction of inflow of the blower is more from the front, and in the ambient air position more from the rear. This results in effects on the output or efficiency and on the acoustics. An additional disadvantage of the above-mentioned arrangement is that, in the case of a compact construction, two ambient air flaps are required to be able to carry out the required adjustments.

The problem of the invention is to provide a compact, space-saving blower air suction device, which can be arranged in flat installation spaces, directly on the windshield frame. The problem also includes achieving an efficient air flow into the blower, and improved acoustics, that is, lower noise and vibration exposure values in the ambient air operation.

SUMMARY OF THE INVENTION

Consistent and consonant with the present invention, a compact, space-saving blower air suction device, which can be arranged in flat installation spaces, directly on the windshield frame, has surprisingly been discovered.

The solution of this problem consists of a blower air suction device of a motor vehicle air conditioner, wherein the blower air suction device comprises the following: a blower with a vertical arrangement consisting of a blower motor, a blower rotor, and a blower opening, wherein the blower is ensheathed by a blower scroll, and an air inlet housing with a fresh air opening formed in a front wall, and with an ambient air opening.

According to the invention, the blower installation is "suspended." This means that the blower is installed with the blower rotor under the blower motor, which is also referred to as "overhead" installation. The air inlet is arranged in the process beneath the blower, wherein the ambient air opening is located before the blower in the travel direction, close to the front wall, and points downward. The fresh air opening is arranged in the front wall directly before the blower opening, in or before the blower axis.

A compact design of the blower air suction device is possible by means of the "overhead" installation of the blower. In the "overhead" installation, the flow into the blower arrives from below. As a result, the installation space has a smaller volume in the front upper area. Thus, the blower can be arranged in a higher position in the vehicle. The shape of the blower motor results, in the upper area, in a free space into which the windshield frame can be "positioned."

As already mentioned, the fresh air opening is arranged directly before the blower opening, in or before the blower axis. In an advantageous embodiment of the invention, the air inlet housing is designed in such a manner that, starting from the fresh air opening, inflowing fresh air is first directed downward through a fresh air duct, and subsequently backward in the travel direction, so that the directions of inflow into the blower are the same for the fresh air inlet and for the ambient air inlet. The downward arrangement of the ambient air opening moreover has acoustic advantages, because the sound is not radiated out onto the occupants, but onto the floor of the vehicle.

Overall, the arrangement according to the invention results in advantages in terms of the installation space, particularly in the z direction. Acoustic advantages resulting from the arrangement of the ambient air also must be mentioned. Moreover, efficiency and acoustics related advantages result from the blower having identical directions of inflow of fresh air and ambient air. In addition, the invention provides a simple flap system for a basic functionality.

The arrangement according to the invention with a blower in overhead position and with an inflow of fresh air and ambient air beneath the blower requires new concepts for the housing design, to allow a simple access to the blower for servicing. In conventional applications, the blower is arranged so that it is accessible. For removal and installation, the apparatus can be taken directly from the air conditioner.

In the flat air conditioners according to the invention, with suspended installation of the blower, the blower rotor is located under the blower motor. As a result, the conventional direct access to the blower is made more difficult because this access is limited, because of the limited installation space in the upward direction, due to the dashboard or the windshield frame. A solution with completely removable air inlet is made difficult because of the limited accessibility to the inlet between the blower scroll and the front wall. The installation of the air inlet housing would be a blind operation. At the same time, the removal space, or the space for the disassembly, is limited.

An additional aspect of the invention thus relates to an air conditioner with removable housing portions for blower disassembly. The problem of this part of the invention is to make possible the removal of the blower in case of arrangements with suspended (overhead) blower. As solution to this problem, a blower air suction device of a motor vehicle air conditioner with suspended blower is proposed, which consists of several small housing units which abut against the blower to the side and beneath, and which are individually removable in the horizontal direction, and thus allow access to the suspended blower.

Here, according to an embodiment of this aspect of the invention, a filter seat housing unit is provided for the arrangement of a filter between the blower and the air inlet housing, wherein the filter seat housing unit contains a blower inlet ring, and can be removed after the filter disassembly together with the blower inlet ring, so that the blower can be disassembled downward.

A portion of the inlet housing can be removed to the side after the filter disassembly. Here, this housing also contains the blower inlet ring, in addition to the filter seat. The housing can be disassembled downward. The screw connection of the housing occurs thereby preferably downward through the blower scroll.

According to an additional embodiment, a filter housing with a cover beneath the blower is provided. Here, the cover functions as a filter cover for filter servicing. After removal of the cover, the blower inlet ring can also be disassembled downward. After the disassembly of the blower inlet ring, the blower can then also be taken out downward. Here too, the blower attachment occurs preferably from below through the blower scroll.

In a further additional embodiment of the above-mentioned aspect of the invention, a portion of the blower scroll is designed so it can be disassembled, making it possible, after the removal of the portion, to remove the blower in the horizontal direction, preferably backward.

Advantageously, the removable portion of the blower scroll is a first blower housing whose end areas are designed in the shape of a wedge, making it possible to horizontally insert the first blower housing into a tongue and groove connection with a second blower housing. Here, the blower can then be attached by means of a clamp connection between the blower housings. In addition, a guide device, for example, a screw, can be inserted for the horizontal alignment of the first blower housing.

Using the above-mentioned advantageous embodiments of the invention, a servicing concept for a suspended blower is provided. For maintenance or repairs, removal can thus take place without cockpit disassembly.

The advantage of all the above-mentioned embodiments is that, in spite of a reduction of the installation space of the air conditioner, a simple access to the blower in the vehicle is possible for servicing.

An additional problem in the case of a compact design and suspended blowers is to provide standard flap configurations with individual flaps and simple sealing shapes for small cross sections for the air inlet. These small cross sections prevent a matching compact arrangement in the air inlet regions. A previous known solution provides for the use of several flaps to reduce the installation space, that is, at least one single flap for the fresh air opening and at least one additional flap for the ambient air opening are provided.

As a solution to this problem, an additional embodiment of the invention provides for the inserted filter to be enclosed by the inlet flap, in order to increase the cross section for the ambient air feed. For this purpose, the flap has a complex flap seal design. More precisely, for the purpose of sealing the effective cross sections of the fresh air opening and of the ambient air opening, a swivelable flap is provided, hereafter referred to as ambient air swivelling flap, whose side wall seal profile is shaped in such a manner that the flap encloses the filter to the side, for the purpose of sealing the fresh air inlet, filter which is arranged between the blower and the air inlet housing, allowing an enlarged effective cross section of the ambient opening.

According to an advantageous embodiment of the flap, the seal surface itself, which is located on the back side of the flap with respect to the travel direction, presents for this purpose a course with a complex, step shaped cross section with an angle of 90° for example. The seal, in the closed position of the fresh air inlet, is subdivided into an area which is oriented horizontally in cross section and a vertically oriented flap seal area. The horizontal flap seal area thereby extends, starting from the swivel axle of the flap, substantially parallel to the large filter surface, but it also extends beyond the margin of the filter surface. It is only then that the transition to the vertical area occurs, which extends into the seat area to the side of the filter, and transitions into a slanted end section. This slanted end section corresponds to a slanted application surface, which is made available by a lateral attachment section for the filter, and which, in the closed position of the fresh air inlet, is applied against this application surface. The advantage compared to the prior art consists of a one-door design for a maximum cross section.

BRIEF DESCRIPTION OF THE DRAWINGS

Additional details, characteristics, and advantages of the invention result from the following description of embodiment examples in reference to the associated drawings.

FIG. 5: shows a diagrammatic representation of the blower air suction device before disassembly, whereas FIG. 6: shows a diagrammatic representation of the blower air suction device before the disassembly, whereas FIG. 7: shows a diagrammatic representation of a blower air suction device before the disassembly, whereas

DETAILED DESCRIPTION OF EXEMPLARY EMBODIMENTS OF THE INVENTION

The following detailed description and appended drawings describe and illustrate various embodiments of the invention.

The description and drawings serve to enable one skilled in the art to make and use the invention, and are not intended to limit the scope of the invention in any manner.

Figure 1:
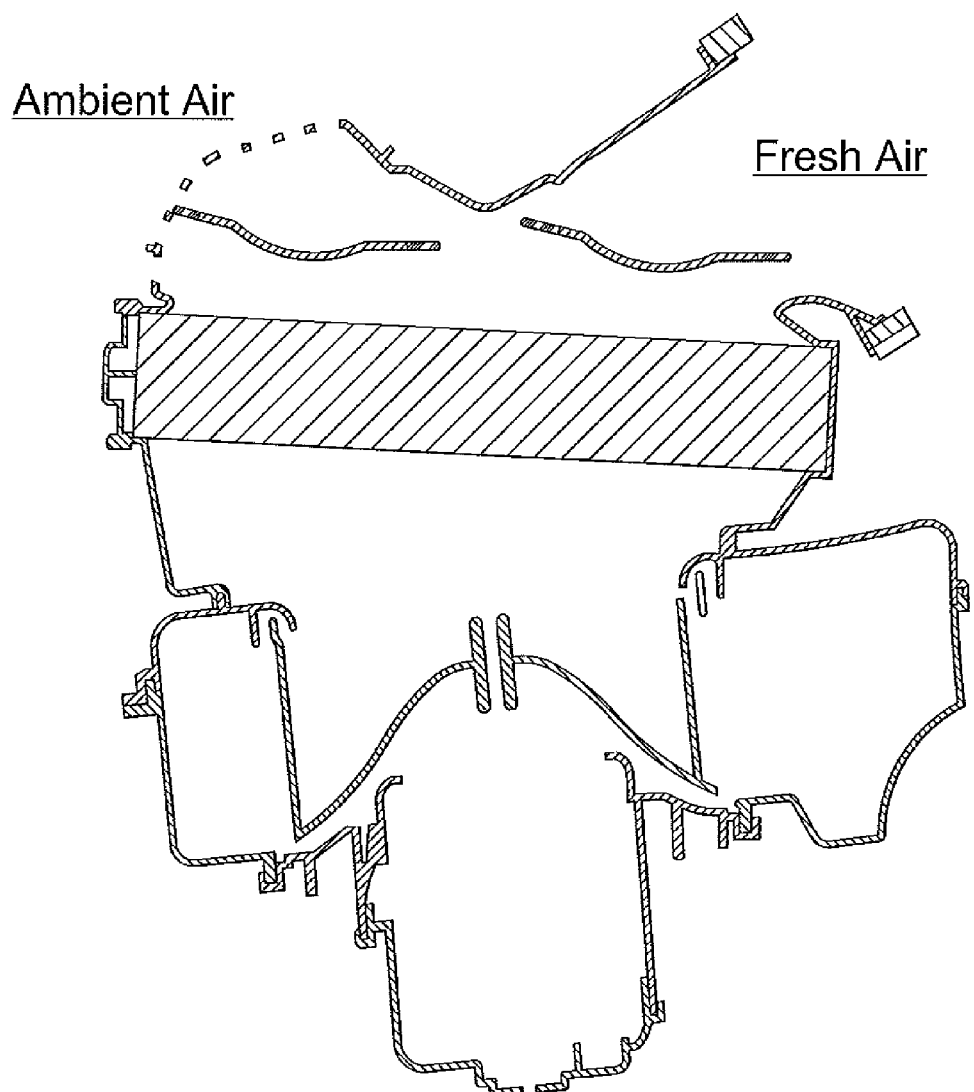
FIG. 1: shows an air inlet arrangement, prior art.

FIG. 1 shows an air inlet housing according to the prior art, which is arranged above the blower. As a result, there is a high space requirement in the upper front area of the vehicle. In many cases no space is available because of the windshield frame. The disadvantage here is particularly the ambient air opening pointing towards the interior or the passenger compartment of the vehicle. This arrangement allows a direct sound path from the blower to the passengers, which has a disadvantageous effect on the acoustics. In addition, this arrangement has different directions of inflow of the blower. In the "fresh air" position, as can be seen in FIG. 1, the blower is exposed more to flow from the front, and in the "ambient air" position more from the back. This results in effects on the output or efficiency and on the acoustics.

Figure 2:
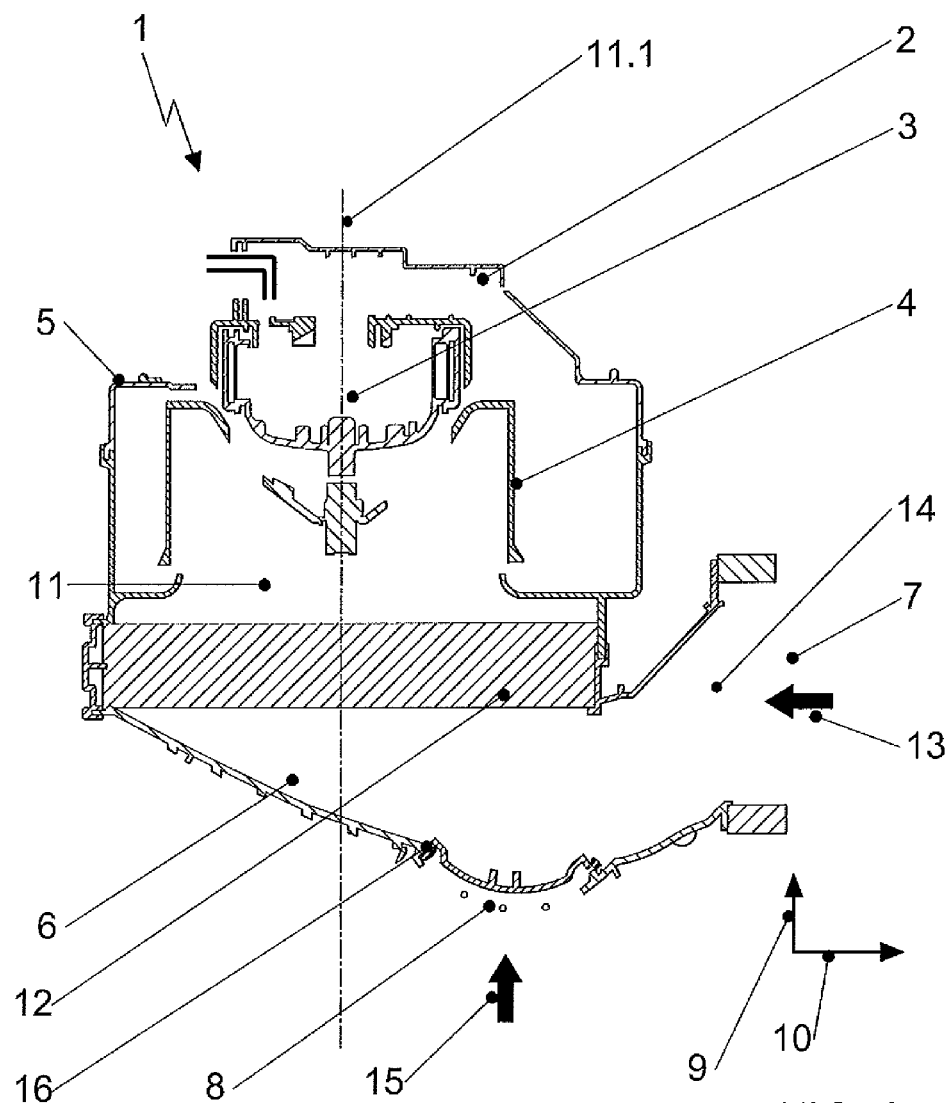
FIG. 2: shows a cross section of a blower air suction device with a suspended blower.

FIG. 2 shows a cross section of a blower air suction device 1 according to the invention of a motor vehicle air conditioner. The blower air suction device 1 comprises a blower 2 with a vertical arrangement consisting of a blower motor 3 (merely outlined in FIG. 2) and of a blower rotor 4, wherein the blower 2 is ensheathed in the area of the blower rotor 4 by a blower scroll 5. Moreover, the blower air suction device 1 comprises an air inlet housing 6 with a fresh air opening 7 formed in a front wall (not shown in FIG. 2) and with an ambient air opening 8.

The blower 2 has a suspended installation, that is, with the blower rotor 4 under the blower motor 3. The air inlet 6 is thereby arranged beneath the blower 2. In FIG. 2, the arrow 9 points upward. The ambient air opening 8 is in the travel direction 10 before the blower 2, close to the front wall, and it points downward, while the fresh air opening 7 is arranged in the front wall, directly before the blower opening 11, in or before the blower axis 11.1. In addition, according to FIG. 2, a filter 12 is arranged between the blower 2 and the air inlet housing 6. In the case of an "overhead" installation, the flow into the blower 2 is from below.

According to FIG. 2, the air inlet housing 6 is designed in such a manner that, starting from the fresh air opening 7, inflowing fresh air 13 is directed first through a fresh air duct 14 downward, and then in the travel direction 10 backward, so that the directions of inflow into the blower 2 are identical for the fresh air inlet and for the ambient air inlet. The arrangement of the ambient air opening 8 downward has acoustic advantages, since the sound is radiated due to the inflowing ambient air 15 not onto the occupants, but onto the floor of the vehicle. Moreover, it is advantageous that the direction of inflow of the blower 2 or of the filter 12, in the embodiment represented, is the same or nearly the same both in the fresh air position and in the ambient air position. According to the representation in FIG. 2, the inflow of fresh air 13 or ambient air 15 can be adjusted with an individual swivelable ambient air swivelling flap 16.

Figure 3:
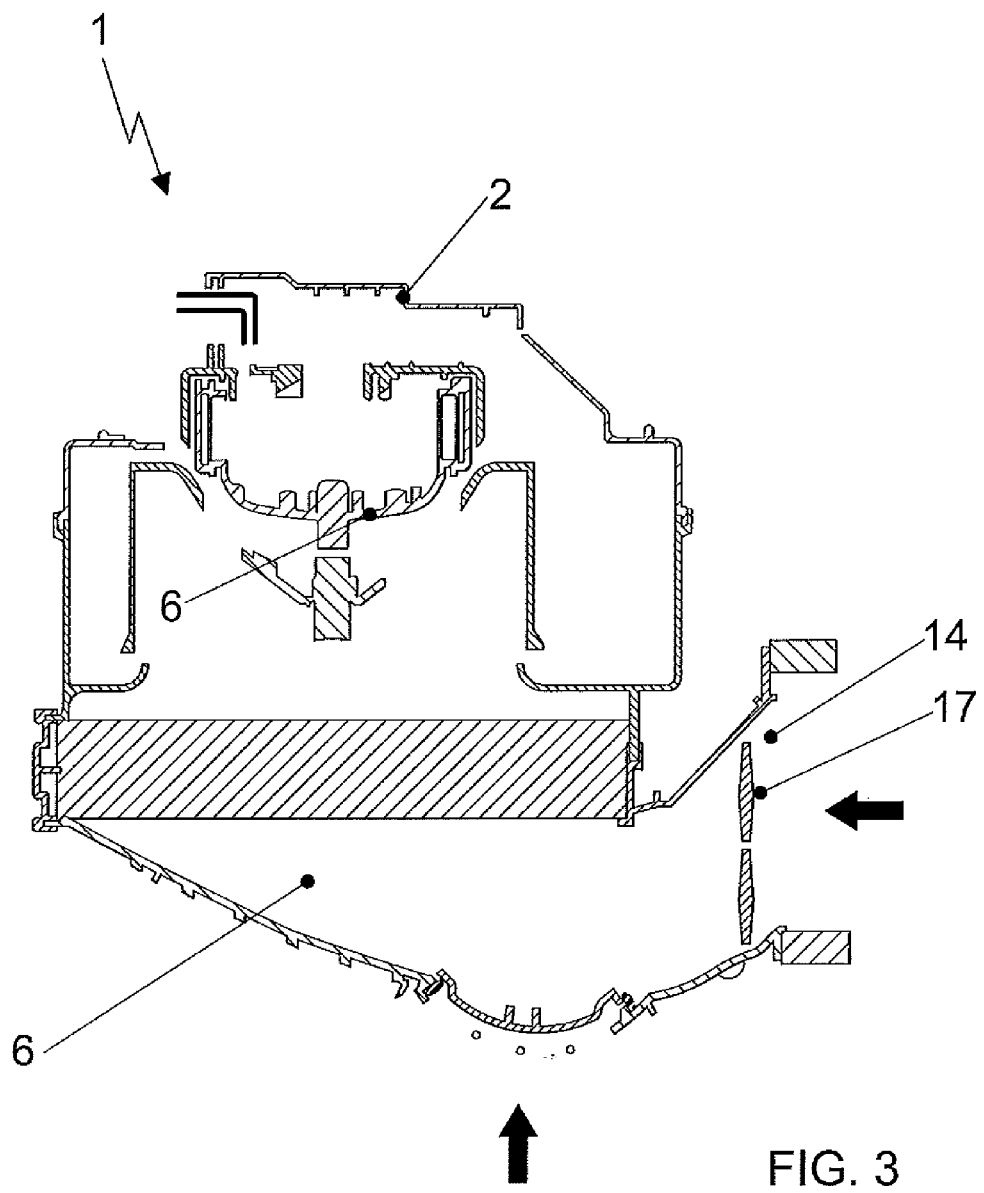
FIG. 3: shows a cross section of a blower air suction device with a suspended blower and a ram air flap.

FIG. 3 shows a cross section through a corresponding blower air suction device 1 with suspended blower 2, which has in addition a ram air flap 17 in the air inlet housing 6 at the lower end of the fresh air duct 14. By means of the ram air flap 17, the air throughput can be kept constant over a wide range of vehicle speeds, since the air throughput which is increased by the ram pressure can be throttled by means of the flap 17.

Figure 4:
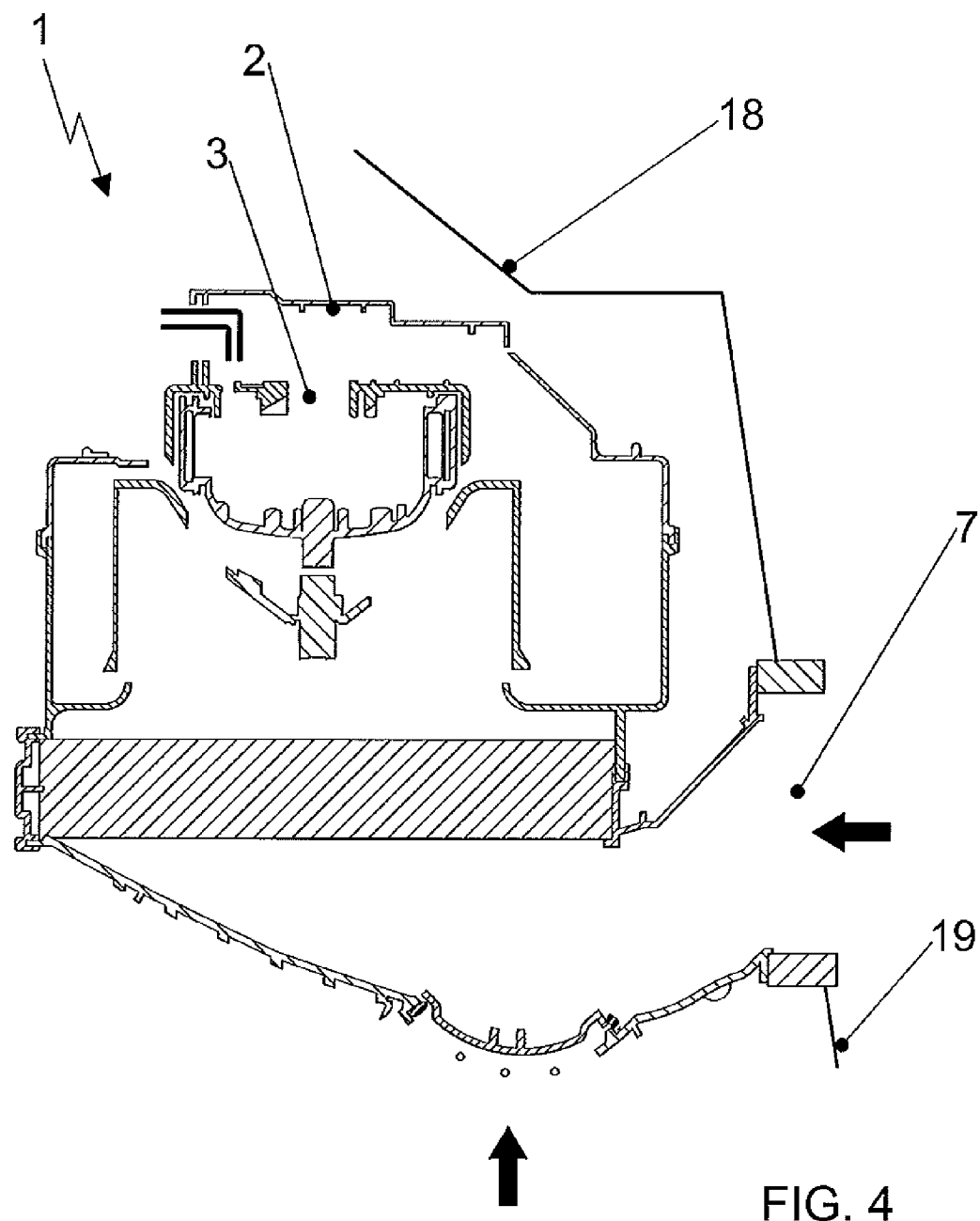
FIG. 4: shows a cross section of a blower air suction device under the windshield frame with a fresh air opening on the front wall.

FIG. 4 shows a cross section of a blower air suction device 1 according to the invention, which is arranged under the windshield frame 18 with fresh air opening 7 on the front wall 19. By means of the "overhead" installation of the blower 2, a compact design of the blower air suction device 1 is possible. In the "overhead" installation, the flow into the blower 2 comes from below. This results in an installation space that has a smaller volume in the front upper area. Thus, the blower 2 can be arranged in a higher position in the vehicle. The shape of the blower motor 3 results, as illustrated in cross section in FIG. 4, in the upper area, in a free space in which the windshield frame 18 can be "positioned."

Arrangements as in FIGS. 2-4, with a blower 2 in overhead position, with an inflow of fresh air or ambient air beneath, require new concepts for the housing design to enable a simple access to the blower 2 for servicing.

In conventional applications, the blower is arranged so that it is accessible. For the purpose of the removal and installation, the apparatus can be taken directly out of the air conditioner.

Figure 5:
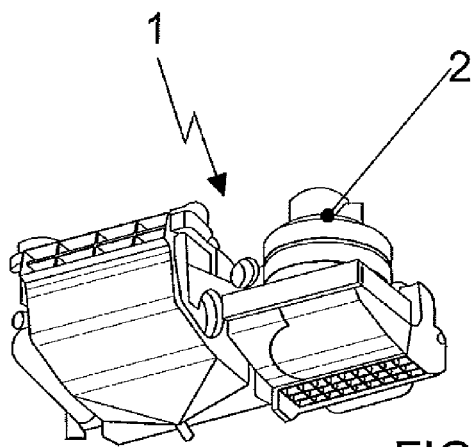
Figure 6:
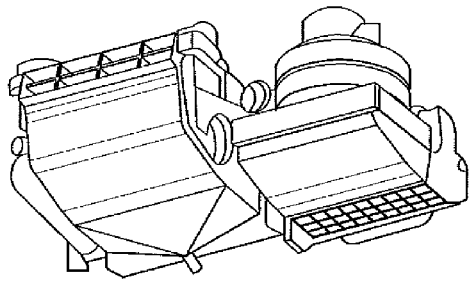
Figure 7:
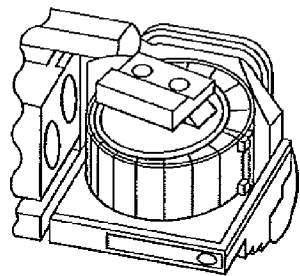

The blower air suction devices 1 of a motor vehicle air-conditioning unit which are proposed in FIGS. 5-7 allow an easy removal of the suspended "overhead" blower 2. All these blower air suction devices 1 have in common that they consist of individual small housing units which abut against the blower 2 to the side or beneath and which are individually removable in the horizontal direction, and consequently allow access to the suspended blower 2.

Figure 5A:
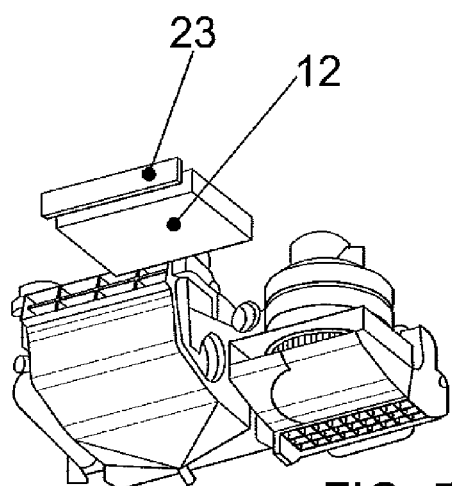
FIGS. 5a-5d show the disassembly of the blower after the removal of an air inlet housing unit.
Figure 5B:
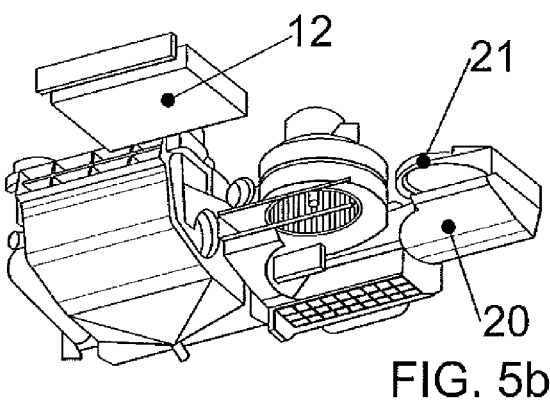
Figure 5C:
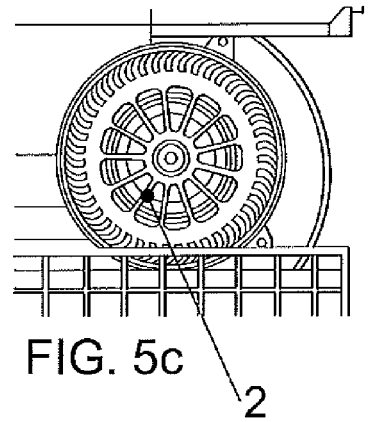
Figure 5D:
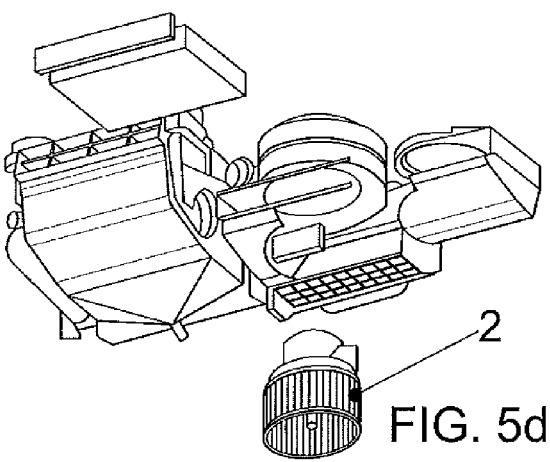

FIGS. 5-5d show a diagrammatic representation of the disassembly of the blower 2 after the removal of an air inlet housing unit 20. The air inlet housing unit 20 is a filter seat housing unit 20 for the arrangement of a filter 12 between the blower 2 and the air inlet housing 6, wherein the filter seat housing unit 20 contains a blower inlet ring 21, and, after the filter disassembly (see FIG. 5a), it can be is removed together with the blower inlet ring 21 (see FIG. 5b), so that the blower 2 can be disassembled downward (see FIGS. 5c and 5d).

Figure 6A:
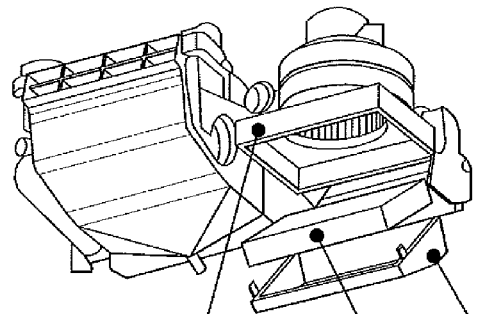
FIGS. 6a-6d show the disassembly of the blower after the removal of a filter cover.
Figure 6B:
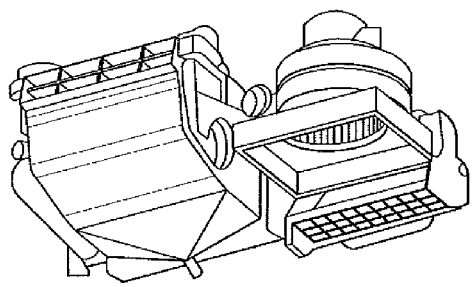
Figure 6C:
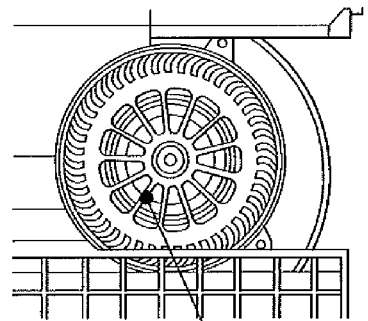
Figure 6D:
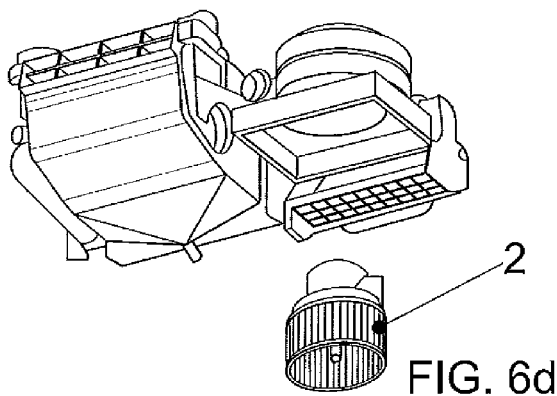

An additional possibility of access to the blower 2 for servicing is represented diagrammatically in FIG. 6. According to FIG. 6, a filter housing 22 is provided with a cover 23 beneath the blower 2, wherein the cover 23 functions as the filter cover 23 for filter servicing. After sideways removal of the filter cover 23 and of the filter 12 (see FIG. 6a), the blower inlet ring 21 can be disassembled downward (see FIG. 6b). After the disassembly of the blower inlet ring 21, the blower 2 can then be taken out downward (see FIGS. 6c and 6d).

FIG. 7 shows an additional variant in which a blower scroll 5 and the disassembly of a horizontally removable housing portion 24 of the blower scroll 5 (see FIG. 7a) are represented, allowing access to the blower 2. The blower 2, after the removal of the first housing portion 24, can be removed in the horizontal direction (see FIG. 7b).

Figure 7A:
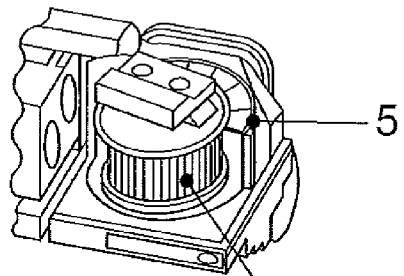
FIGS. 7a-7b show the removal of a blower after the disassembly of a portion of the blower scroll.
Figure 7A:
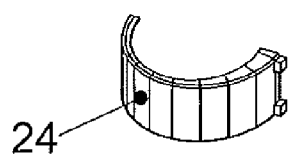
Figure 7B:
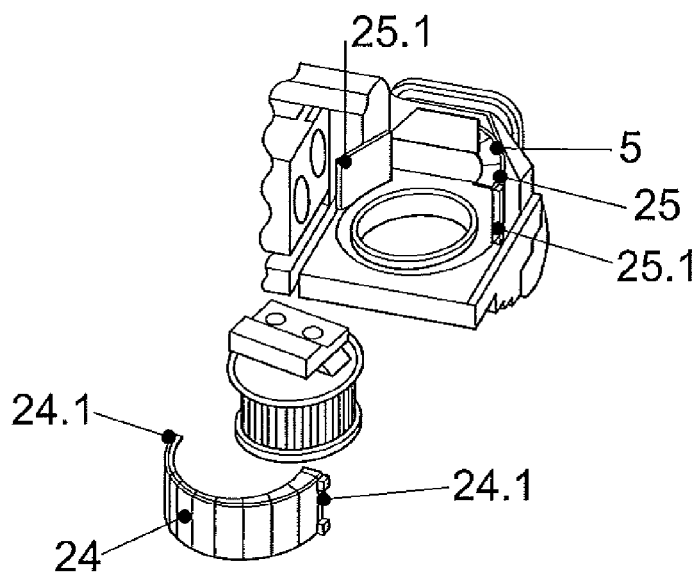

The removable housing portion 24 of the blower scroll 5 according to FIG. 7a is a first blower housing 24, which is designed as a portion of a coil, and which corresponds, in its end areas 24.1, to the end areas 25.1 of a second fixed blower housing 25, which is also designed as a portion of a coil. The first blower housing 24 is preferably designed in the shape of a wedge in its end areas 24.1, which makes it possible for the first blower housing 24 to be inserted horizontally into the second blower housing 25, and to be connected to the latter by means of a tongue and groove connection. The blower 2 is clamped thereby between the blower housings 24 and 25. In addition, a guide device can be introduced for the horizontal alignment of the first blower housing 24.

Figure 8A:
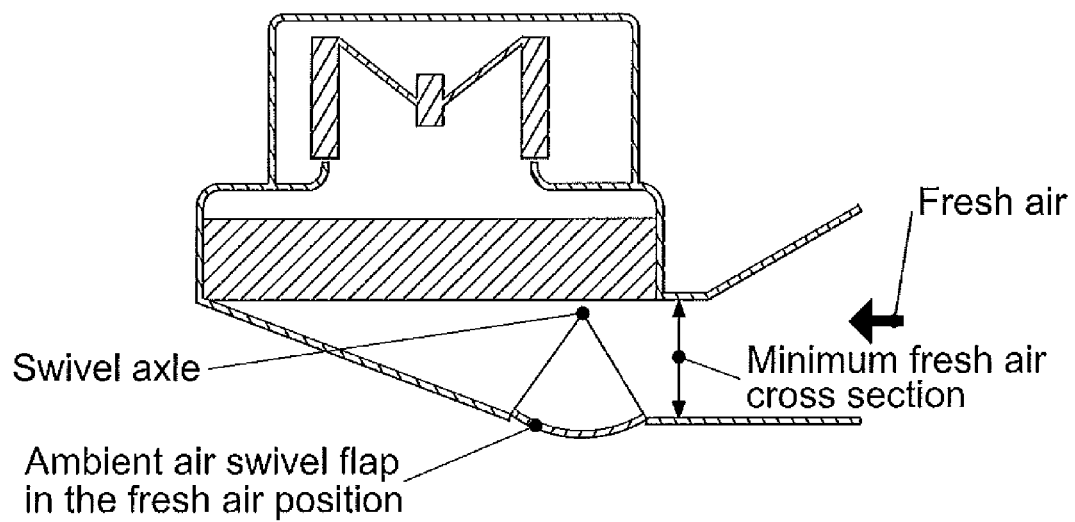
FIG. 8a: shows a blower air suction device with an ambient air swivelling flap according to the prior art in the fresh air position.

FIG. 8a shows a blower air suction device of a motor vehicle air conditioner with suspended blower arrangement. This blower air suction device has an ambient air swivelling flap which is designed according to the prior art. The side wall seal profile of the ambient air swivelling flap extends from the outer margins of the ambient air swivelling flap in each case straight to the swivel axle, so that the ambient air swivelling flap in cross section (that is, on the side walls) is substantially triangular in shape, wherein the front surface of the ambient air swivelling flap is bent with convex curvature. In the representation of FIG. 8*a*, the ambient air swivelling flap is here in the fresh air position, that is, the flap closes the ambient air opening, while the fresh air can flow through the minimum (effective) fresh air cross section of the fresh air opening, from the front side into the blower.

Figure 8B:
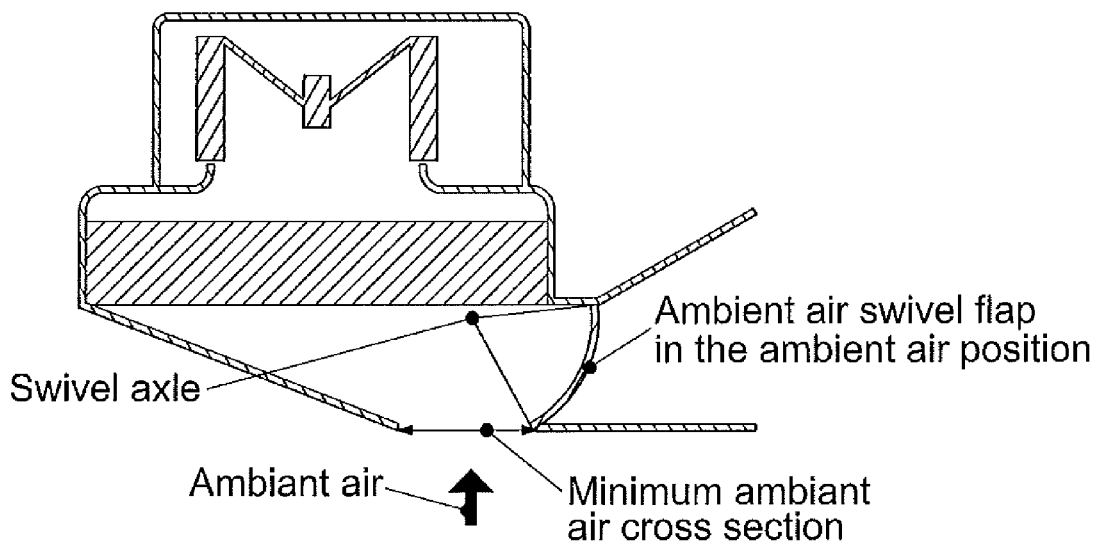
FIG. 8b: shows a blower air suction device with an ambient air swivelling flap according to the prior art in the ambient air position.

FIG. 8*b* shows the same blower air suction device, in which the ambient air swivelling flap designed according to the prior art is in the ambient air position. This means that ambient air can flow in through the opened minimum (effective) ambient air cross section of the ambient air opening, from below into the blower housing, while the minimum (effective) fresh air cross section of the fresh air opening is covered by the ambient air swivelling flap. The minimum ambient air cross section of the ambient air inlet (ambient air opening) here must not be greater than the cross section which the ambient air swivelling flap is capable of covering. This leads to a considerable limitation if the goal is to design the largest possible effective ambient air cross section of the ambient air inlet.

Figure 9A:
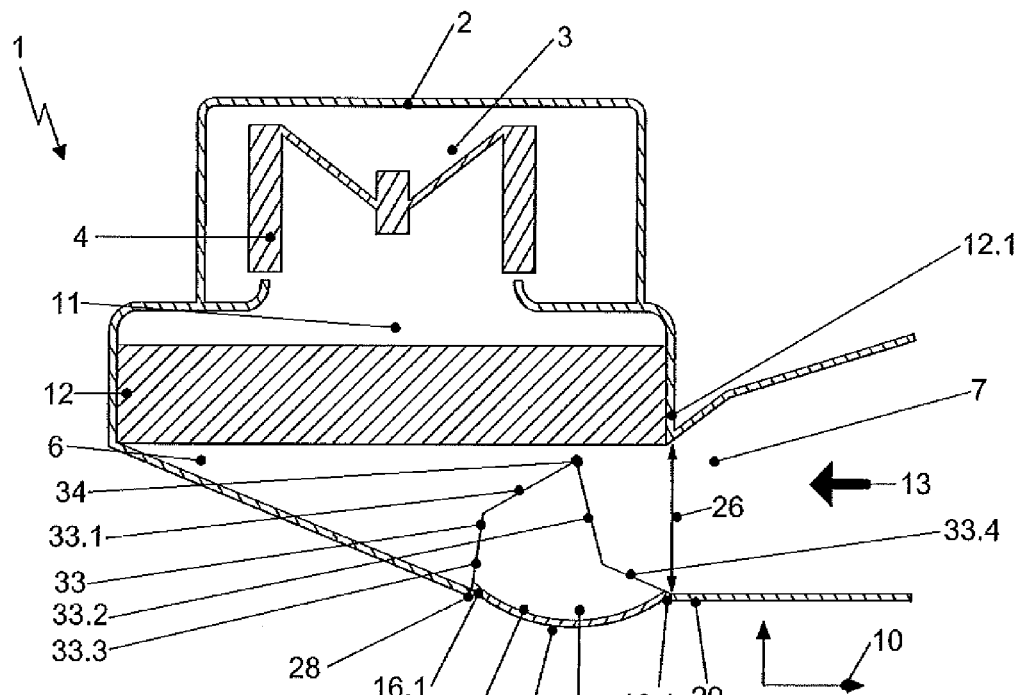
FIG. 9a: shows a blower air suction device with an ambient air swivelling flap according to the invention.
Figure 9B:
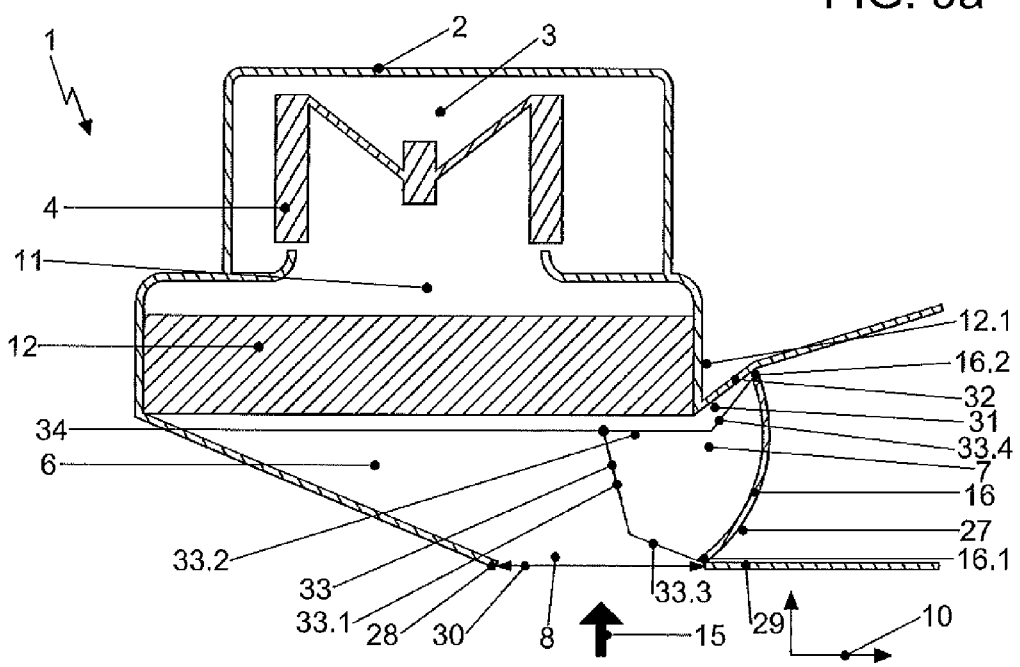
FIG. 9b: shows a blower air suction device with enclosure of the filter by the side wall seal profile of the ambient air swivelling flap.

FIGS. 9*a* and 9*b* show a blower air suction device 1 of a motor vehicle air conditioner, which has an ambient air swivelling flap 16 which is designed according to an advantageous embodiment of the invention. The blower 2, with its blower motor 3 and its blower rotor 4, is oriented vertically. Here, the blower 2 has a suspended installation, that is, with the blower rotor 4 under the blower motor 3. The air inlet housing 6 is arranged in the process beneath the blower 2. A filter 12 is arranged between the blower 2 and the air inlet housing 6. The air inlet housing 6, in the travel direction 10, has a fresh air opening 7 formed in a front wall (not shown in FIGS. 9*a* and 9*b*) as well as an ambient air opening 8 located close to the front wall and pointing downward. The ambient air opening 8 is arranged in the travel direction 10 before the blower 2, and the fresh air opening 7 directly before the blower opening 11. Here, FIG. 9*a* shows the blower air suction device 1 in the fresh air position, that is, with opened fresh air opening 7, and with an ambient air opening 8 closed by the ambient air swivelling flap 16, so that the fresh air 13 can flow through the minimum (effective) fresh air cross section 26 of the fresh air opening 7 from the front side into the blower 2.

The ambient air flap 16 itself has a front surface 27 which is bent in cross section with predominantly convex curvature. In the representation in FIG. 9*a*, that is, in the fresh air position, an end section 16.1 of the ambient air swivelling flap 16 is applied against a corresponding application surface, which is located on a margin 28 of the ambient air opening 8. This margin 28, with respect to the travel direction 10, constitutes the rear margin 28 of the ambient air opening 8. At the same time, the ambient air swivelling flap 16, in a 100% fresh air position, is applied with its facing end section 16.2 against a horizontal separation wall 29, which forms the front margin (with respect to the travel direction 10) of the ambient air opening 8, and moreover also separates the ambient air opening 8 and the fresh air opening 7, which are oriented mutually perpendicularly, from each other.

FIG. 9*b* shows the blower air suction device 1 in the ambient air position, that is, with opened ambient air opening 8, and with the fresh air opening 7 closed by the ambient air swivelling or pivotable flap 16, so that ambient air 15 can flow in through the minimum ambient air cross section 30 of the ambient air opening 8 from below into the blower 2. The shape of the ambient air swivelling flap 16 makes it possible to noticeably increase the minimum (effective) ambient air cross section 30 of the ambient air opening 8. In contrast, the size of the minimum (effective) fresh air cross section 26 remains unchanged compared to the prior art (see FIG. 8*a*). In the representation in FIG. 9*b*, that is, in a 100% ambient air position, the ambient air swivelling flap 16 is applied, with the now upper end section 16.2, against a corresponding application surface in a flap holding space 31, which is located to the side of the front filter margin 12.1, in travel direction 10, of the filter 12. The corresponding application surface is formed by a wall 32 of the flap holding space 31, wall 32 which is directed toward the filter 12, and slanted downward opposite the travel direction 10. The end section 16.1 of the ambient air swivelling flap 16, section which is not in the flap holding space 31 in the ambient air position, forming instead the lower end section 16.1 of the ambient air swivelling flap 16, is applied against the separation wall 29.

FIGS. 9*a* and 9*b* moreover show the seal profile 33 of the ambient air swivelling flap 16 in cross section, profile 33 which is referred to below as side wall seal profile 33, wherein the ambient air swivelling flap 16 is in the fresh air position in the representation in FIG. 9*a*, and thereby covers the ambient air opening 8. The application of the ambient air flap 16 against the corresponding application surfaces with respect to the profile 33 thereby results in the sealing of the ambient opening 8. The side wall seal profile 33 as shown has a step-like shape. The ambient air swivelling flap 16 is swivelably mounted on a swivel axle 34. The position of the swivel axle 34 is unchanged compared to the prior art (see FIGS. 8*a* and 8*b*). According to the representation in FIG. 9*a*, from the swivel axle 34, on the one hand, a section 33.1 of the side wall seal profile 33 starts, in a direction opposite the travel direction 10, section 33.1 which is oriented substantially horizontally or slightly slanted downward, and, on the other hand, a vertical section 33.2 of the side wall seal profile 33 starts, the latter section being oriented downward substantially vertical with respect to the former section. During the further course, the section 33.1 changes into a section 33.3 of the side wall seal profile 33, section 33.3 which is oriented downward substantially vertically, and finally ends at the margin 28.

For the purpose of sealing the ambient air opening 8, the other section 33.2 of the side wall seal profile 33, section 33.2 which starts from the swivel axle 34, on the other hand extends first substantially vertically downward, as already mentioned. This section 33.2 of the side wall seal profile 33 transitions into a short section 33.4, which is in travel direction 10 horizontal or inclined slightly downward, and which finally ends in the area of the separation wall 29 against which the end section 16.2 of the ambient air swivelling flap 16 is applied. Along the side wall seal profile 33, a corresponding application surface is provided, for the step-shaped ambient air swivelling flap 16, which is in a 100% fresh air position.

FIG. 9*b* shows, as already mentioned, the ambient air swivelling flap 16 in the ambient air position, that is, with fresh air opening 7 closed. The already mentioned section 33.2 of the side wall seal profile 33 of the ambient air swivelling flap 16 starts from the swivel axle 34, on one side. This section 33.2 of the side wall seal profile 33 of the ambient air swivelling flap 16 extends, with closed fresh air opening 7, starting from the swivel axle 34, substantially parallel to the downward pointing, horizontally oriented surface of the filter 12. In the area of the front filter margin 12.1 in the travel direction 10, this section 33.2 of the side wall seal profile 33 transitions upward in the now vertically oriented (slanted upward in travel direction 10) section 33.4, which, before the swiveling of the ambient air swivelling flap 16 into the ambient air position, is applied against the separation wall 29 in the fresh air position (see FIG. 9*a*). Finally, this section 33.4 of the side wall seal profile 33 is applied against the already mentioned slanted wall 32. This means that the side wall seal profile 33 of the ambient air swivelling flap 16, which is represented in FIG. 9b, is shaped in such a manner with the sections 33.2 and 33.4 that the ambient air swivelling flap 16 "encloses" the filter 12 to the side for the purpose of sealing the fresh air opening 7.

The section 33.1 of the side wall seal profile 33, section which starts on the other side from the swivel axle 34, in the ambient air position, with fresh air opening 7 closed, extends substantially vertically downward. This section 33.1 of the side wall seal profile 33, in travel direction 10, transitions into the short horizontal or slightly downward sloped section 33.3. This section 33.3, before the swiveling of the ambient air swivelling flap 16 into the ambient air position, was still applied, in the fresh air position, against the rear margin 28 of the ambient air opening 8 (see FIG. 9a). In the ambient air position, with fresh air opening 7 closed, the section 33.3 finally ends at the separation wall 29. In the process, by means of the separation wall 29, an additional application surface for the ambient air swivelling flap 16 is provided at the same time, when the ambient air swivelling flap 16 is in the ambient air position.

A side wall seal profile 33 designed in this manner, with the possibility of holding the ambient air swivelling flap 16 to the side of the filter 12 in the final position of the ambient air position, offers, for compact arrangements in air inlet regions, in each case a large minimum (effective) cross section 30 for the ambient air opening 8 (ambient air cross section 30), without requiring the use of several flaps. The fresh air opening 7 and the ambient air opening 8 are positioned so that they are oriented (substantially perpendicularly) with respect to each other, in such manner that the ambient air swivelling flap 16 can be moved, about the swivel axle 34 positioned in the air inlet housing 6, between the final position with closed fresh air opening 7 in case of 100% open ambient air opening 8, and the final position with closed ambient air opening 8 and 100% open fresh air opening 7.

Figure 10A:
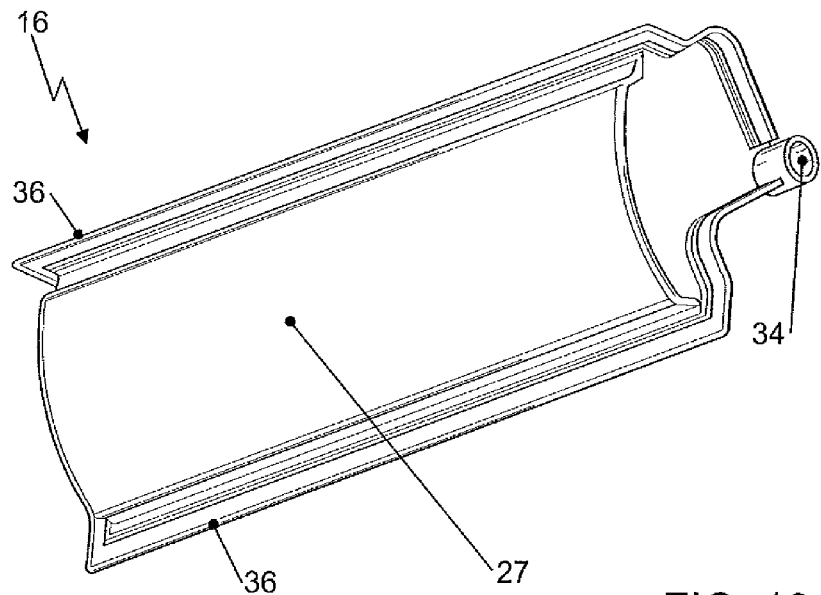
FIG. 10a: shows the front side of a flap with complex seal design.
Figure 10B:
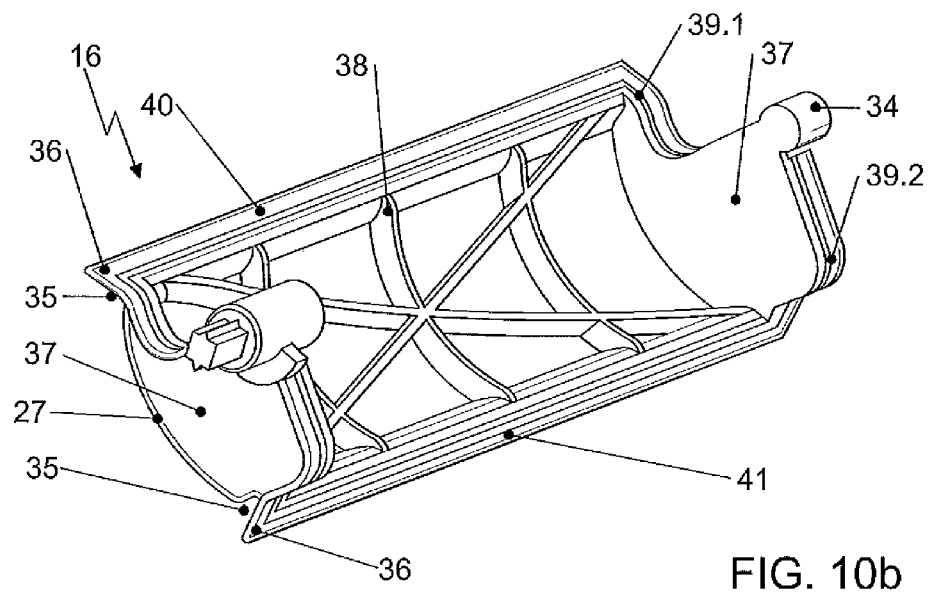
FIG. 10b: shows the back side of the flap.

A suitable air swivelling flap 16 with complex seal design is represented in FIGS. 10a and 10b, where FIG. 10a shows the front side and FIG. 10b the rear side of the flap. The ambient air swivel flap 16, as already described, has a front surface 27 which is curved in cross section with predominantly convex curvature. In the upper and lower end areas of the front surface 27, the convex curvature transitions in each case into a recess 35, wherein the recesses 35 end with the projections 36 that terminate the front surface 27. The curved front surface 27, together with two mutually facing side walls 37, forms an open hollow body 38. On the free margins of the hollow body 38, seal surfaces 39.1, 39.2 are formed. The free margins of the facing side walls 37 are designed with step-like cross section so that they match the corresponding side wall seal profile 33, and each presents a holding fixture for the swivel axle 34 on which the ambient air swivelling flap 16 is swivelably mounted. The end sections of the seal surfaces 39.1, 39.2 are located in each case on the projections 36. The end sections in each case extend over the total upper longitudinal margin 40 or over the lower longitudinal margin 41 of the free hollow body 38.

From the foregoing description, one ordinarily skilled in the art can easily ascertain the essential characteristics of this invention and, without departing from the spirit and scope thereof, make various changes and modifications to the invention to adapt it to various usages and conditions.

LIST OF REFERENCE NUMERALS

1 Blower air suction device
2 Blower
3 Blower motor
4 Blower rotor
5 Blower scroll
6 Air inlet housing, air inlet
7 Fresh air opening
8 Ambient air opening
9 Direction arrow up
10 Travel direction
11 Blower opening
11.1 Blower axis
12 Filter
12.1 Front filter margin
13 Inflowing fresh air
14 Fresh air duct
15 Inflowing ambient air
16 Flap, ambient air swivelling flap
16.1 End section 16.1 of the ambient air swivelling flap 16
16.2 End section 16.2 of the ambient air swivelling flap 16
17 Ram air flap
18 Windshield frame
19 Front wall
20 Air inlet housing unit, filter seat housing unit
21 Blower inlet ring
22 Filter housing
23 Filter cover, cover
24 Portion, housing portion (of the blower scroll 5), first blower housing
24.1 End area of the housing portion (of the blower housing) 24
25 Second blower housing
25.1 End area of the second blower housing 25
26 Minimum (effective) fresh air cross section of the fresh air opening 7
27 Front surface (of the ambient air swivelling flap 16, convexly curved front surface)
28 Margin of the ambient air opening 8
29 Separation wall
30 Minimum (effective) ambient air cross section of the ambient air opening 8, cross section
31 Flap holding space
32 Slanted wall
33 Side wall seal profile (of the ambient air swivelling flap 16), profile
33.1 Section of the side wall seal profile 33
33.2 Section of the side wall seal profile 33
33.3 Section of the side wall seal profile 33
33.4 Section of the side wall seal profile 33
34 Swivel axle
35 Recesses (of the ambient air swivelling flap 16 on the front surface 28)
36 Projections (in the end area of the ambient air swivelling flap 16)
37 Facing side walls (of the ambient air swivelling flap 16)
38 Hollow body (formed by the front surface 31 and the side walls 37)
39.1 Seal surfaces
39.2 Seal surfaces
40 Top longitudinal margin (of the hollow body 38)
41 Bottom longitudinal margin (of the hollow body 38)

What is claimed is:

1. A blower air suction device of a motor vehicle air conditioner comprising:
a blower with a vertical arrangement including a blower motor, a blower rotor, and a blower opening, wherein the blower is ensheathed by a blower scroll, and wherein the blower is suspended and the blower rotor is disposed beneath the blower motor to facilitate a compactness of the blower air suction device; and an air inlet housing including a fresh air opening formed in a wall, the fresh air opening positioned in the wall spaced apart from the blower in a direction of travel of the motor vehicle, the air inlet housing further including an ambient air opening, wherein the ambient air opening is disposed beneath the blower and points downward to militate against sound radiating from the blower air suction device towards a passenger compartment of the vehicle, the fresh air opening facing a front of the motor vehicle, and both the fresh air opening and the ambient air opening are disposed between a central axis of the blower and the front of the motor vehicle.

2. The blower air suction device according to claim 1, wherein a flow of air through the air inlet housing begins at the fresh air opening, continues through a fresh air duct first in a downward direction, and subsequently continues away from the direction of travel, resulting in identical directions of inflow into the blower for the fresh air inlet and the ambient air inlet.

3. The blower air suction device according to claim 1, wherein the blower air suction device further comprises a plurality of housing units, which abut the blower on a side or beneath, and which are removable individually to permit access to the blower.

4. The blower air suction device according to claim 1, wherein a filter seat housing unit is provided for arrangement of a filter between the blower and the filter inlet housing, wherein the filter seat housing unit is removable and includes a blower inlet ring.

5. The blower air suction device according to claim 1, further comprising a filter housing disposed beneath the blower and including a cover, wherein the cover functions as a filter cover for filter servicing, and wherein after removal of the filter cover, a blower inlet ring can be disassembled downward, and after disassembly of the blower inlet ring, the blower can be removed downwardly.

6. The blower air suction device according to claim 1, wherein the blower is attached by a screw connection from below through the blower scroll.

7. The blower air suction device according to claim 1, wherein a housing portion of the blower scroll is removable to facilitate removal of the blower.

8. The blower air suction device according to claim 7, wherein the housing portion of the blower scroll includes a first blower housing and a second blower housing, the first blower housing having a wedge-shape in end areas thereof to facilitate insertion of the first blower housing into a tongue and groove connection with the second blower housing, and wherein the blower is attached by a clamp connection between the first blower housings and the second blower housing.

9. The blower air suction device according to claim 8, wherein the blower housing is oriented horizontally by means of a guide device.

10. The blower air suction device according to claim 1, wherein a pivotable flap is provided for sealing the fresh air opening and of the ambient air opening.

11. The blower air suction device according to claim 10, wherein a sealing surface of the flap has a step-shaped cross section.

12. A blower air suction device of a motor vehicle air conditioner comprising:

a blower with a vertical arrangement including a blower motor, a blower rotor, and a blower opening, wherein the blower is ensheathed by a blower scroll, and wherein the blower is suspended, and the blower rotor is disposed beneath the blower motor to facilitate a compactness of the blower air suction device; and an air inlet housing including a fresh air opening formed in a wall, the fresh air opening positioned in the wall away from a passenger compartment of the motor vehicle, the air inlet housing further including an ambient air opening, wherein the ambient air opening is disposed beneath the blower and points downward to militate against sound radiating from the blower air suction device towards a passenger compartment of the vehicle, the fresh opening facing a front of the motor vehicle, and both the fresh air opening and the ambient air opening are disposed intermediate a central axis of the blower and the wall.

13. The blower air suction device according to claim 12, wherein the blower air suction device further comprises a plurality of housing units, which abut the blower on a side or beneath, and which are removable individually to permit access to the blower.

14. The blower air suction device according to claim 12, wherein a filter seat housing unit is provided for arrangement of a filter between the blower and the filter inlet housing, wherein the filter seat housing unit is removable and includes a blower inlet ring.

15. The blower air suction device according to claim 12, further comprising a filter housing disposed beneath the blower and including a cover, wherein the cover functions as a filter cover for filter servicing, and wherein after removal of the filter cover, a blower inlet ring can be disassembled downward, and after disassembly of the blower inlet ring, the blower can be removed downwardly.

16. The blower air suction device according to claim 12, wherein a housing portion of the blower scroll is removable to facilitate removal of the blower.

17. The blower air suction device according to claim 1, wherein the ambient air opening is spaced apart from the central axis of the blower in the direction of travel of the motor vehicle and the fresh air opening is spaced apart from the ambient air opening in the direction of travel of the motor vehicle.

* * * * *